United States Patent [19]
Ishida

[11] Patent Number: 5,802,372
[45] Date of Patent: *Sep. 1, 1998

[54] LANGUAGE PROCESSING SYSTEM

[75] Inventor: Kyoko Ishida, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 304,944

[22] Filed: Sep. 13, 1994

[30] Foreign Application Priority Data

Sep. 13, 1992 [JP] Japan ............... 5-226292
Feb. 28, 1994 [JP] Japan ............... 6-030656

[51] Int. Cl.$^6$ .............................. G06F 9/45
[52] U.S. Cl. ........................ 395/705; 395/708
[58] Field of Search .................. 395/700, 705, 395/708, 709

[56] References Cited

U.S. PATENT DOCUMENTS 5,355,491 10/1994 Lawlor ................ 395/700

FOREIGN PATENT DOCUMENTS 2024726 1/1990 Japan.

*Primary Examiner*—Emanuel Todd Voeltz
*Assistant Examiner*—Kakali Chaki
*Attorney, Agent, or Firm*—Foley & Lardner

[57] ABSTRACT

A language processing system includes a parsing portion for inputting a source program described by a high-level language, making analysis and generating an intermediate code file on the basis of the results of analysis, and a code generating portion for generating an object program corresponding to the source program analyzed by the parsing portion. The code generating portion has a parameter analyzing portion for making analysis of data length of parameter information contained in the source program, and a parameter assigning portion for assigning parameter information to a predetermined data region in descending order depending upon the data length and in the order of appearance.

12 Claims, 15 Drawing Sheets

FIG.8
FIG.9
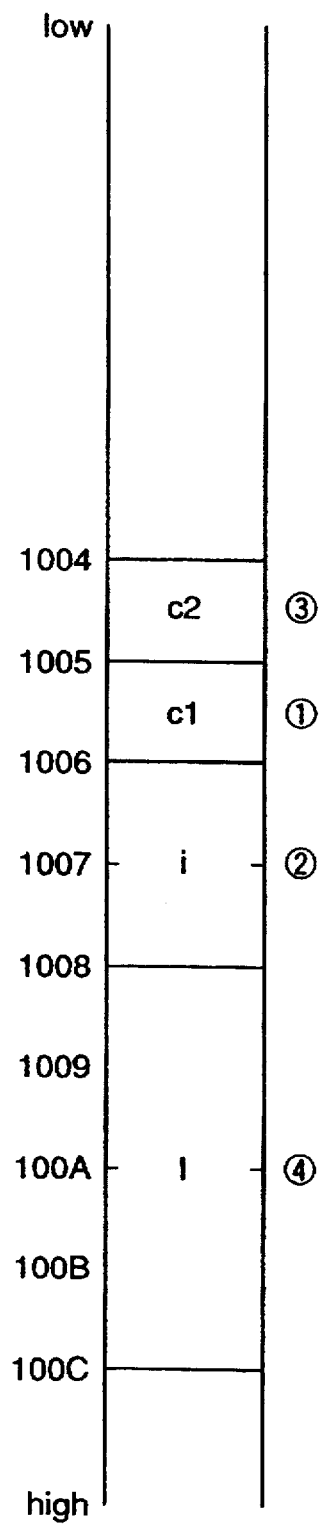
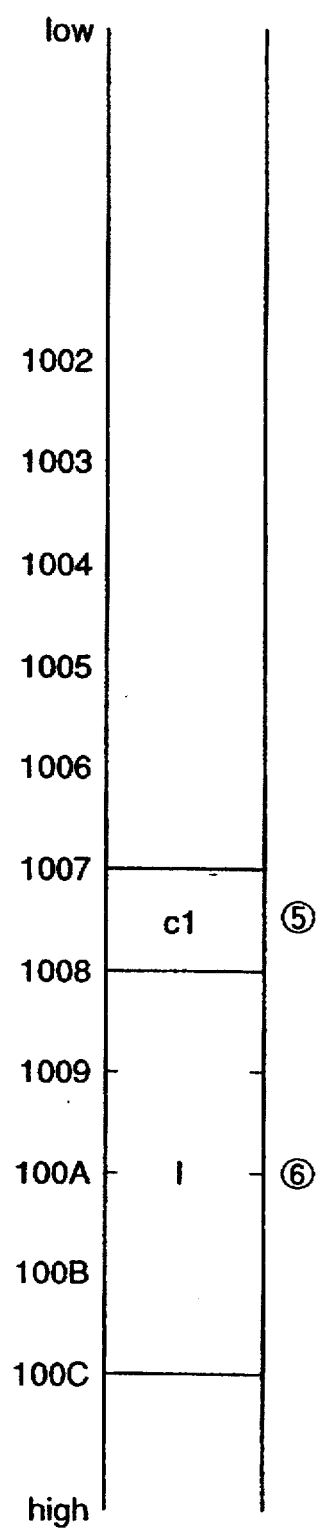

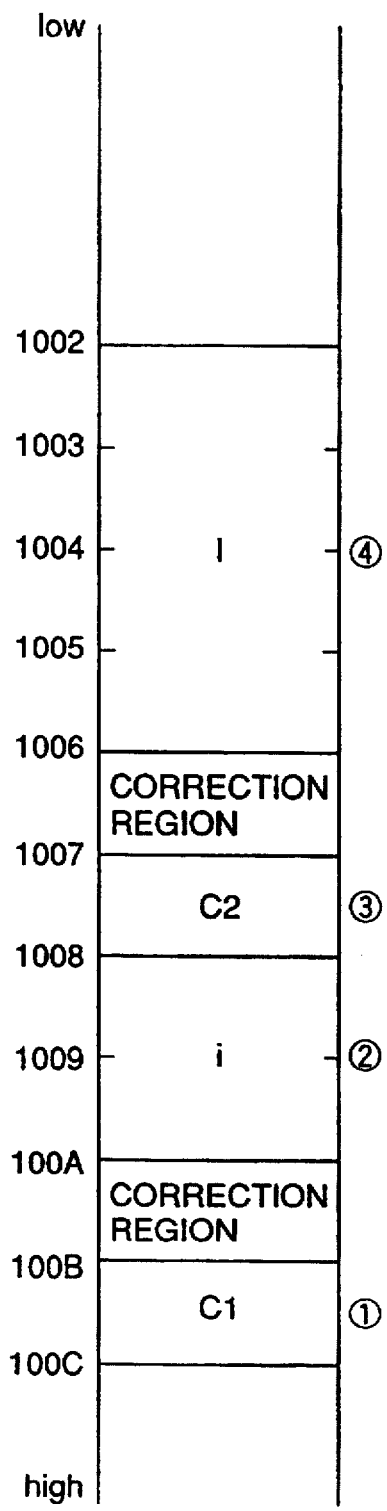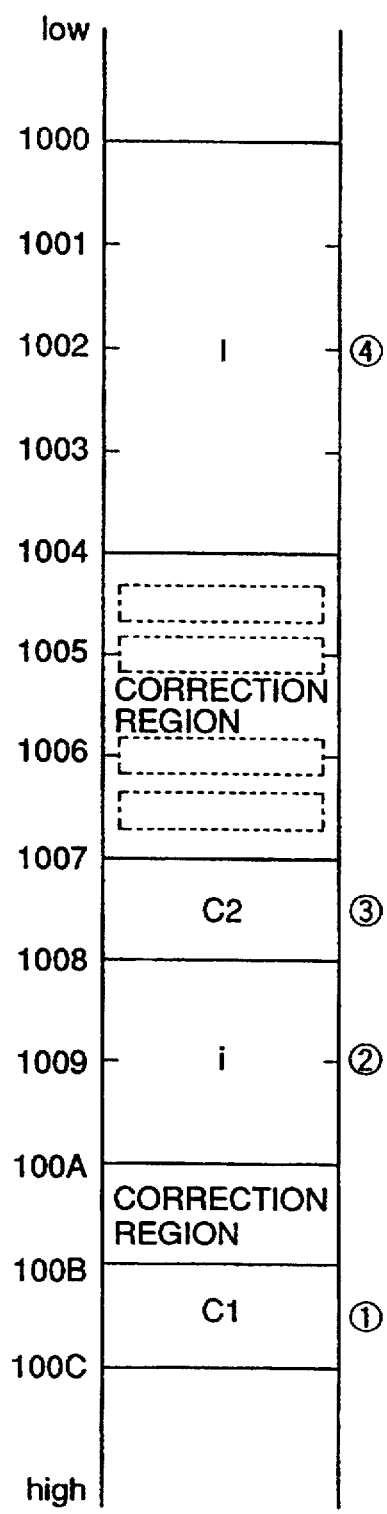

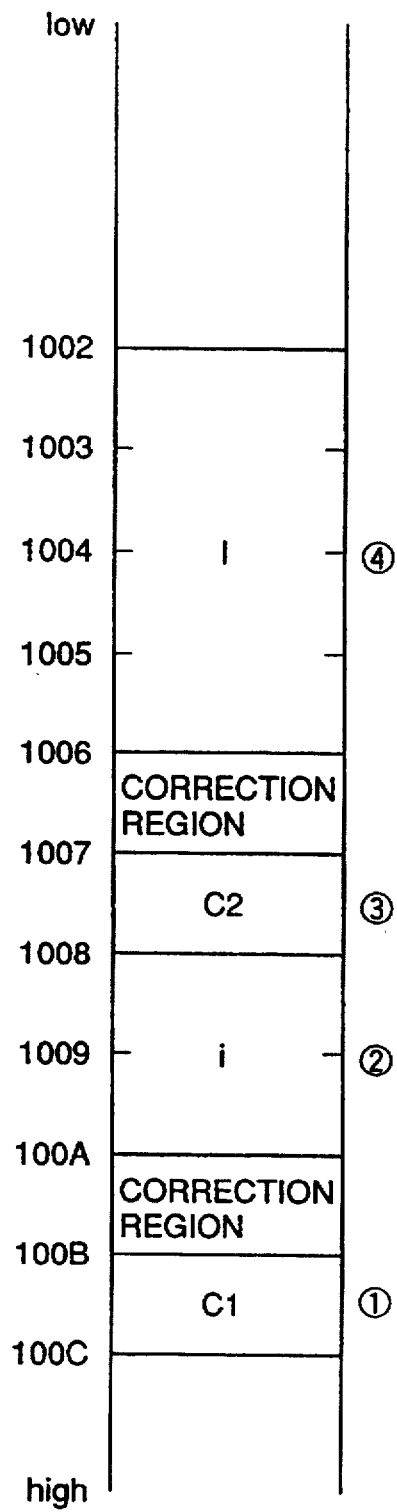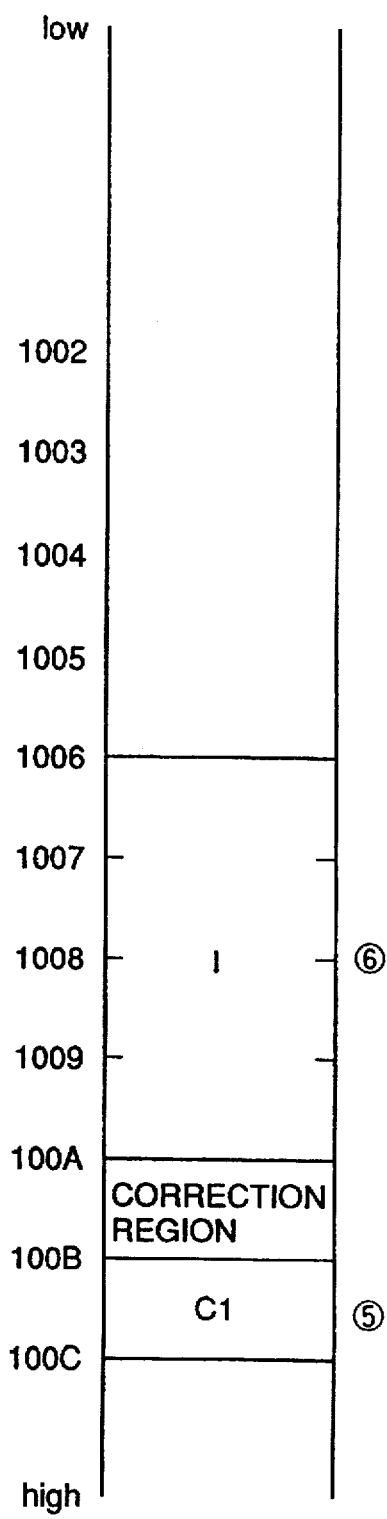
FIG.15 PRIOR ART
FIG.16 PRIOR ART

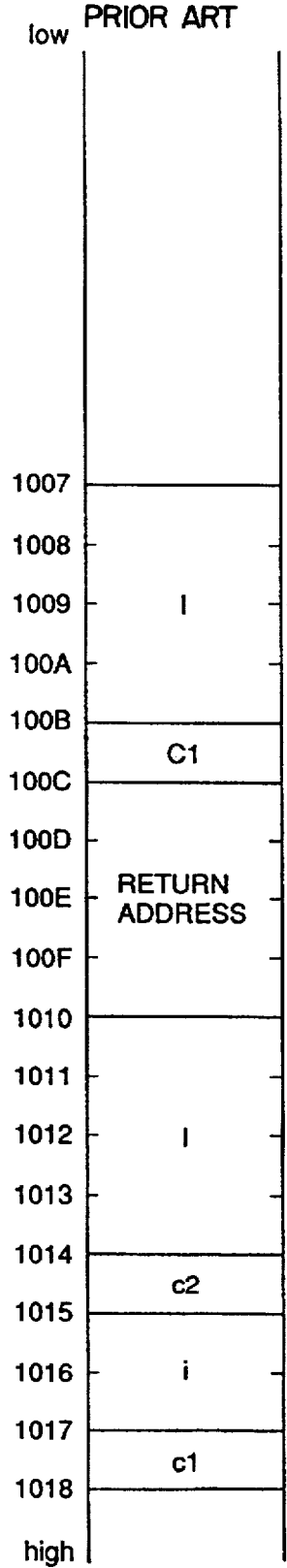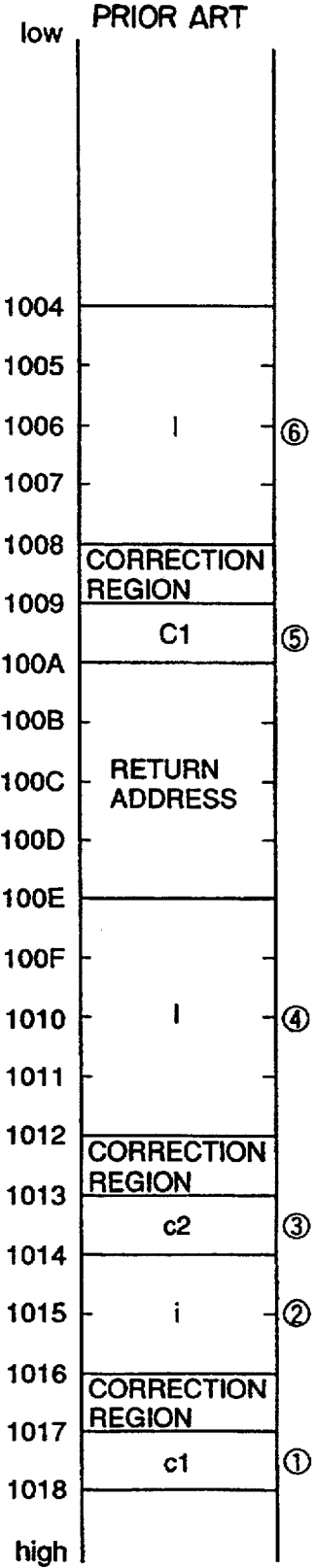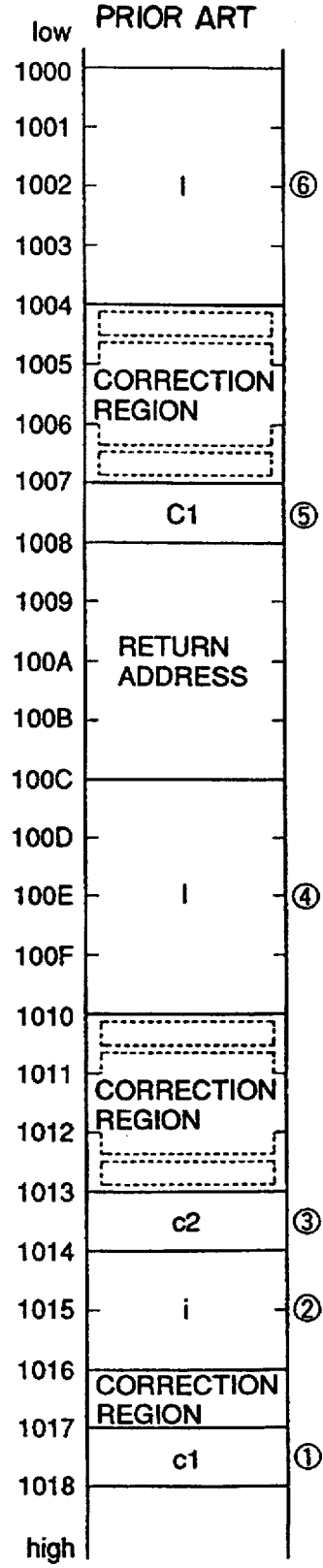

FIG.20

/* DATA DEFINITION */

| char | c1 ; | ... | ① |
| int | i ; | ... | ② |
| char | c2 ; | ... | ③ |
| long | l ; | ... | ④ | main ()
{
}

FIG.21
/* PROTOTYPE DECLARATION */
void func (long a, char b,  ~ F1
        int c, char d) ;
void sub (long a, char b) ;  ~ F2
char      c1, c2 ;
int       i ;
long     l ;
main ()
{
    func (l,c2,i,c1) ;  ~ F3
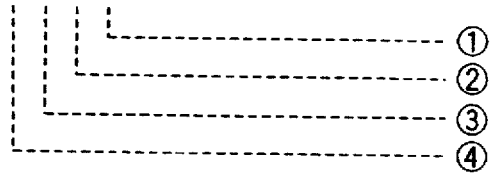
    sub (l,c1) ;  ~ F4
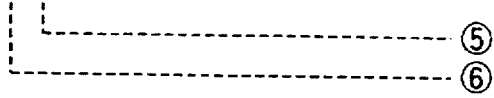

FIG.22
/* PROTOTYPE DECLARATION */
void func (long a, char b,  ～ F1
        int c, char d) ;
void sub (long a, char b) ;  ～ F2
char    c1, c2 ;
int     i ;
long   l ;
main ()
{
        func (l,c2,i,c1) ;  ～ F3
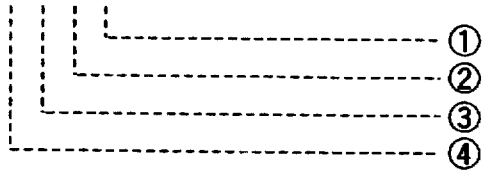
}
func (a,b,c,d)
{
        sub (l,c1) ;  ～ F4
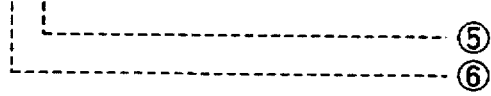
}

# LANGUAGE PROCESSING SYSTEM

BACKGROUND OF THE INVENTION

1. Field of the Invention

The present invention relates to a language processing system and a language processing method therefor. More specifically, the invention relates to a language processing system and a language processing method for coding process of a high level language as a program language of a microprocessor.

2. Description of the Related Art

In general, a machine language program instructing operation of the computer is described by a string of figures, such as binary number or hexadecimal number and so forth. Since the machine language program described by the string of figures is too difficult to understand, a programmer typically prepares a program (hereinafter referred to as "source program") by a high level language employing expression easier for the programmer to understand and then translates the source program into the machine language program. Then, the machine language program is loaded to the computer for execution. A compiler is one of a language processing system performing this translation.

In the conventional language processing, data assignment of external parameter information is typically performed in the order of appearance of those external parameter information. For instance, in the example of a source program described by C-language shown in FIG. 20, the external parameter information in the program are "c1", "i", "c2", "1" in the order of appearance. Then, the data assignment is performed in the order of "c1", "i", "c2", "1". Here, "c1" and "c2" are external parameter information having 1 byte of data length, "i" is external parameter information having 2 bytes of data length and "1" is external parameter information having 4 bytes of data length. In FIG. 20, "char", "int", "long" are identifiers respectively indicating attributes of data.

Also, FIG. 10 is an imaginary illustration showing manner of assignment of "c1", "i", "c2", "1" in data regions. In FIG. 10, when "c1" is assigned to an address from 100C, "i" is assigned to an address from 100B, "c2" is assigned to an address from 1009 and "1" is assigned to the address from 1008.

However, in certain architecture of the computer, it is possible that the data assigned in the odd number address cannot be accessed or that while the data in the odd number address can be accessed, the access speed for the data in the even number address is higher than that in the odd number address. In such case, in order to make all data accessible and to speed-up access for permitting higher speed execution of the program, a process called as "alignment" is performed.

The alignment is a restriction of data assignment for accessing of data assigned to the data regions. In general, there are 2-bytes alignment, 4-bytes alignment and so forth. 2-bits alignment is assignment for assigning the parameter in the data regions of addresses of multiple of 2. Also, 4-bytes alignment is assignment for assigning parameter in the data regions of addresses of multiple of 4.

In the explanatory illustration in FIG. 10, in the computer requiring 2 bytes alignment, while the parameter "c1" as 1 byte data assigned to the address 100C can be accessed, the parameter "i" as 2 bytes data assigned to the address 100B cannot be accessed.

FIG. 11 is also an explanatory illustration showing the case where data is assigned by 2-bytes alignment in assigning of data for the data regions shown in FIG. 10. The difference between the charts of FIGS. 10 and 11 is that, in FIG. 11, 1-byte correction regions are inserted between the external parameters "c1" and "i" and between the external parameters "c2" and "1". FIG. 12 shows the case where the 4-bytes alignment is employed for data assignment with respect to the data region of FIG. 10. In FIG. 12, 1-byte correction region is inserted between the external parameters "c1" and "i" and 3-bytes correction region is inserted between the external parameters "c2" and "1".

Similar manner is applicable in call function performed in execution of the program. In F3 of the source program described by C-language shown in FIG. 21, function func is called from a function main. At this time, arguments "1", "c2", "i", "c1" to be transferred to the function func are stacked in a memory region called as a stack. Also, F1 and F2 in FIG. 21 are called as declarations of prototype designating value to be returned by the function and type of the argument. When no declaration of prototype is present in the program, the argument is stacked expanded in integer number.

Conventionally when the argument of the function is stacked in the stack region, it is performed in the order to writing of the arguments. In case of F3 illustrated in FIG. 21, the argument is described in the order of "c1", "i", "c2", "1". In this case, the arguments to be transferred to the function func are stacked in the order of "1", "c2", "i", "c1". FIG. 13 illustrates the condition of the stack region immediately after calling of the function func in the example of the program shown in FIG. 21. On the other hand, FIG. 14 is the condition of the stack region immediately after calling a function sub.

① in FIG. 13 and ⑤ in FIG. 14 are stacked from the same address in the stack region. This is because when the process is returned from the function func, the temporarily used stack region is returned to the original (cleared).

The condition where the arguments of the function in the stack regions of FIGS. 13 and 14 stacked by 2-bytes alignment process are shown in FIGS. 15 and 16.

Next, a C-language source program shown in FIG. 22 shows an example, in which the function func is called from the function main and the function sub is further called from the function func.

On the other hand, FIG. 17 is an illustration showing the condition of the stack region immediately after calling the function sub in the example of program of FIG. 22. FIG. 18 shows the stack region in the case where the arguments are stacked in the stack region by 2-bytes alignment, and FIG. 19 shows the stack region in the case where the arguments are stacked in the stack region by 4-bytes alignment. In FIGS. 17 to 19, "return address" means necessary information to return the process to the function main after completion of the process in the function func. In the shown case, the return address is 4-byte data. In comparison with the example of the program in FIG. 21, the example of the program in FIG. 22 utilizes the stack region sequentially. As set forth above, in the conventional language processing executing system, it is required to derive the correction region for performing data assignment by alignment process and thus requires greater data region than the actual data amount. Also, due to difference of architecture, alignment amount is differentiated, such as 2-bytes alignment, 4-bytes alignment and so forth. Therefore, different alignment process becomes necessary for each architecture of the computer.

In addition, an optimal data assigning system disclosed in Japanese Unexamined Patent Publication No. 2-24726, as the prior art, proposes arrangement of data in the computer which requires setting of address to a base register when data is made reference to. However, the computer for which this proposal is applicable is limited to the computer which can be made reference to by designating direct address and, in which the designated address requires alignment depending the data length.

In the above-mentioned conventional language processing program executing system, it is inherent to derive the corresponding correcting region for data assignment requiring alignment process. Therefore, extra data region is used for the alignment process.

Also, since the alignment amount is differentiated depending upon the difference of the architecture of the computer, such as 2-bytes alignment, 4-bytes alignment and so forth, alignment process has to be differentiated for each architecture of the computer.

SUMMARY OF THE INVENTION

It is an object of the present invention to provide a language processing system which can eliminate necessity for deriving the correcting region which has been required in the prior art, and thus reduce data region for assigning parameter or arguments of function by assigning external parameter in a program or arguments in a function in the descending order from that having large data length and in the order of appearance.

Another object of the present invention is to provide a language processing system which permits assignment of parameter or argument in the uniform manner irrespective of an alignment amount and whereby permits unitary data assignment process for parameter or argument without depending upon the difference of architecture.

In order to accomplish the above-mentioned objects, according to one aspect of the invention, a language processing system comprises:

parsing means for inputting a source program described by a high-level language, making analysis and generating an intermediate code file on the basis of the results of analysis;

code generating means for generating an object program corresponding to the source program analyzed by the parsing means, the code generating means including parameter analyzing means for making analysis of data length of parameter information contained in the source program; and parameter assigning means for assigning parameter information to a predetermined data region in descending order depending upon the data length and in the order of appearance.

In the preferred construction, the language processing system may further comprise parameter information storage means for storing the parameter information and the data length analyzed by the data analyzing means. Alternatively, the language processing system may further comprise parameter information storage means for storing the parameter information and the data length analyzed by the data analyzing means in mutually associated position, wherein when the data length of the parameter information analyzed by the parameter analyzing means is the maximum, the parameter information is assigned to the data region by the parameter assigning means in the order of appearance, and when the data length of the parameter information analyzed by the parameter analyzing means is not the maximum, the parameter information storage means stores the parameter information and the data length in the order of appearance.

The parameter information storage means may classify the parameter information depending upon the data length and store in the order of appearance. In such case, the parameter information storage means may store sets of the parameter names of the parameter information and the data lengths in the order of appearance.

When the data length of the parameter information is powers of 2, the parameter assigning means may assign the parameter information in the data region in the descending order depending upon the data length.

According to another aspect of the invention, a language processing system comprises:

parsing means for inputting a source program described by a high-level language, making analysis and generating an intermediate code file on the basis of the results of analysis;

code generating means for generating an object program corresponding to the source program analyzed by the parsing means, the code generating means including parameter analyzing means for making analysis of data length of parameter information contained in the source program;

assigning order analyzing means for making analysis of order for assigning the parameter information in a predetermined data region with reference to the data length of the parameter information analyzed by the parameter analyzing means and outputting an assignment order information;

parameter assigning means for assigning parameter information to the predetermined data region according to the assignment order information.

The parameter information may be argument of a function described in the source program. The language processing system may further comprise parameter information storage means for storing the parameter information and the data length and the assignment order information.

The assignment order analyzing means may make analysis of the assignment order of the parameter information in such a manner that parameter information is assigned to the data region in descending order depending upon the data length and in the order of appearance. In the alternative, the language processing system further comprises parameter information storage means for storing the parameter information, the data length and the assignment order information, wherein the assignment order analyzing means makes analysis of the assignment order of the parameter information in such a manner that parameter information is assigned to the data region in descending order depending upon the data length and in the order of appearance, and stores the data length and the assignment order information in the parameter information storage means in the order of appearance.

In the further alternative, the language processing system further comprises parameter information storage means for storing the parameter information, the data length and the assignment order information, wherein the assignment order analyzing means makes analysis of the assignment order of the parameter information in such a manner that parameter information is assigned to the data region in descending order depending upon the data length and in the order of appearance, and stores the data length and the assignment order information in the parameter information storage means in the order of appearance, and wherein the parameter assigning means assigns the parameter information to the data region according to the assignment order information with reference to the assignment order information of the parameter information stored in the parameter information storage means in the order of appearance.

Other objects, features and advantages of the present invention will become apparent from the detailed description given hereinafter.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 8 is an illustration of the condition of a stack region, for which assignment of arguments of a function by the third embodiment of the language processing system;

FIG. 9 is an illustration of the condition of a stack region, for which assignment of arguments of a function by the third embodiment of the language processing system;

FIG. 11 is an illustration showing the condition of assignment of the external parameter in the data region of FIG. 10, assigned by 2-bytes alignment;

FIG. 12 is an illustration showing the condition of assignment of the external parameter in the data region of FIG. 10, assigned by 4-bytes alignment;

FIG. 15 is an illustration showing the condition of assignment of the external parameter in the data region of FIG. 13, assigned by 2-bytes alignment;

FIG. 16 is an illustration showing the condition of assignment of the external parameter in the data region of FIG. 14, assigned by 4-bytes alignment;

FIG. 17 is an illustration showing another example of the condition of assignment, in which the arguments of function are assigned in the order of appearance;

FIG. 18 is an illustration showing the condition of assignment of the external parameter in the data region of FIG. 17, assigned by 2-bytes alignment;

FIG. 19 is an illustration showing the condition of assignment of the external parameter in the data region of FIG. 17, assigned by 4-bytes alignment;

FIG. 20 is an illustration showing an example of a source program including definition of an external parameter;

FIG. 21 is an illustration showing an example of a source program having a declaration of prototype; and FIG. 22 is an illustration showing another example of a source program having a declaration of prototype.

DESCRIPTION OF THE PREFERRED EMBODIMENT

The present invention will be discussed hereinafter in detail in terms of the preferred embodiments. In the following description, numerous specific details are set forth in order to provide a thorough understanding of the present invention. It will be obvious, however, to those skilled in the art that the present invention may be practiced without these specific details. In other-instance, well-known structures are not shown in detail in order to unnecessary obscure the present invention.

Figure 1:
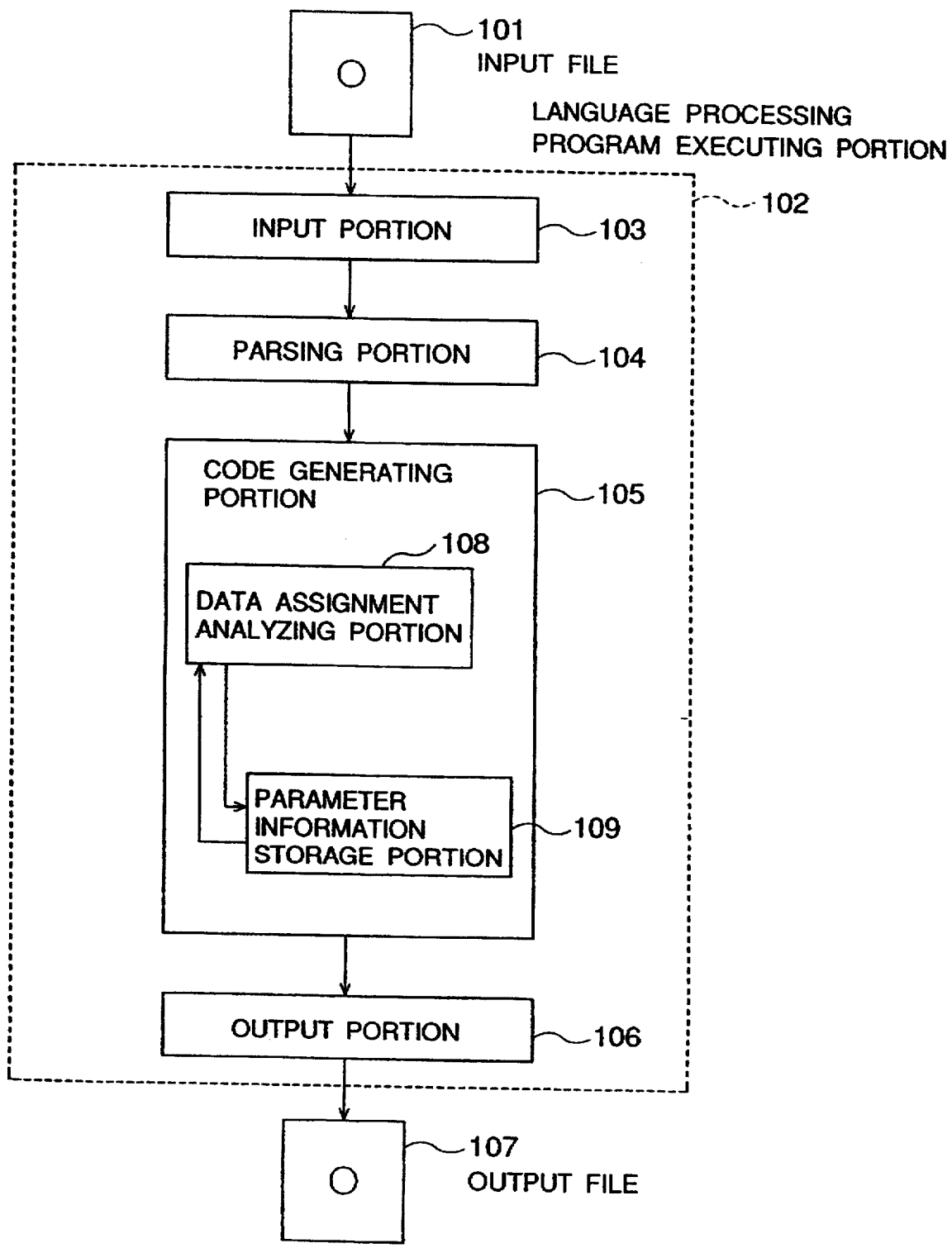
FIG. 1 is a block diagram showing a construction of the first embodiment of a language processing system according to the present invention.

FIG. 1 shows a block diagram showing the first embodiment of a language processing system according to the present invention. As shown in FIG. 1, the shown embodiment of a language processing system includes an input file 101 storing a source program, a language processing program executing portion 102 for generating an object program from the source program, and an output file 107 for storing the generated object program.

The language processing program executing portion 102 comprises an input portion 103 receiving the source program from the input file 101, a parsing portion 104 for parsing the input source program and generating an intermediate code file, a code generating portion 105 generating an object program from thus generated intermediate code file and an output portion 106 for outputting thus generated object file to the output file 107. The code generating portion 105 includes a data assignment analyzing portion 108 for analyzing data length of external parameter information contained in the input source program and assigning the external parameter information to predetermined data region and a parameter information storage portion 109 for storing the external parameter information classified depending upon the data length.

Figure 2:
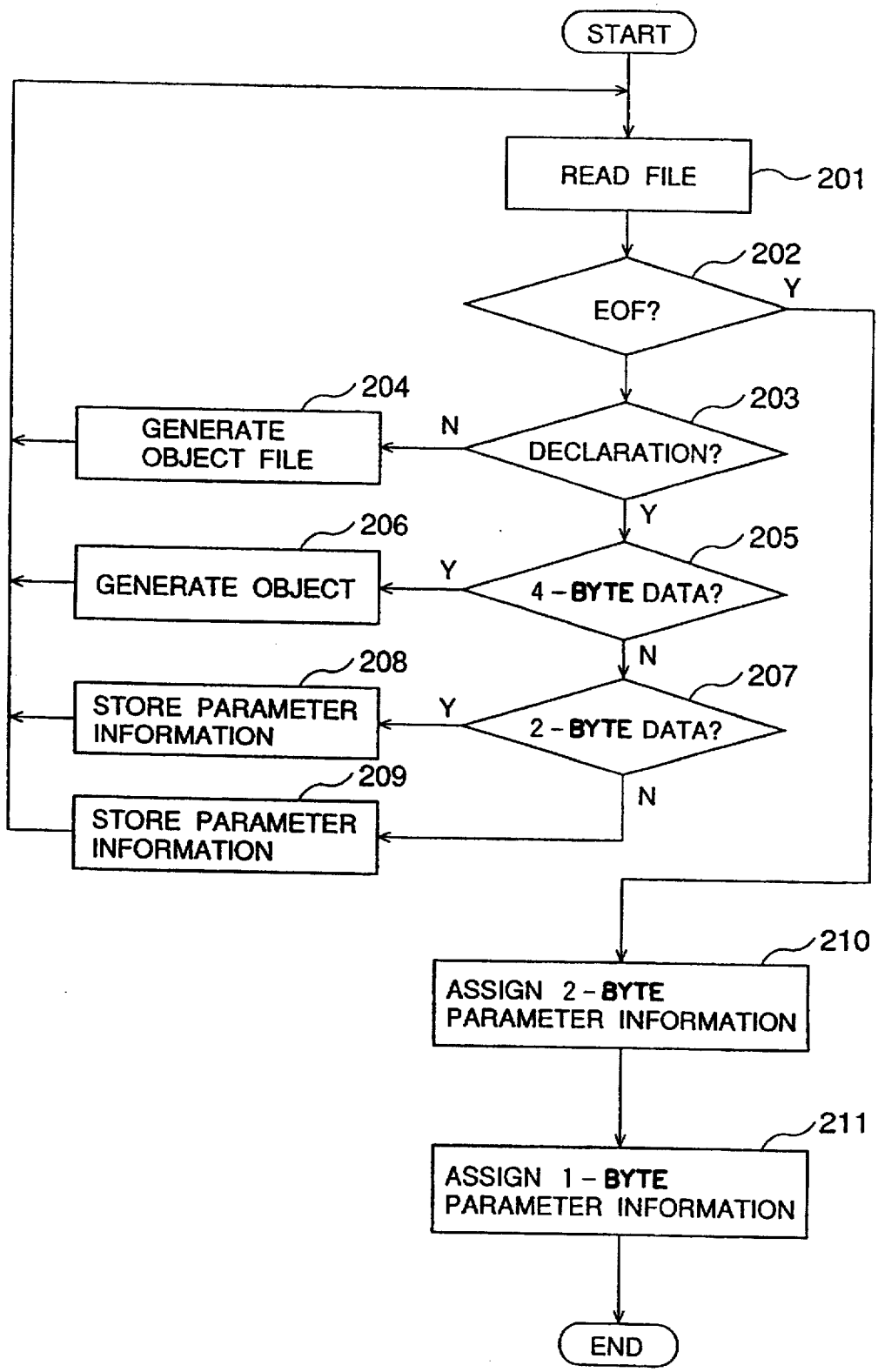
FIG. 2 is a flowchart showing a process in a data assignment analyzing portion in the first embodiment of the language processing system.

FIG. 2 is a flowchart showing a processing procedure in the data assignment analyzing portion 108 included in the first embodiment of the language processing program executing portion 102 shown in FIG. 1. It should be noted that, in the shown embodiment, it is assumed that the external parameter information to be handled in the program are three kinds respectively having data lengths of 1 byte, 2 bytes and 4 bytes.

At first, the source program input through the input portion 103 is parsed into units (hereinafter referred to as recording unit) of a data definition, an equation, a function, a function definition, a branch by the parsing portion 104 and output as the intermediate code file. In a reading step of 201, the intermediate code file output from the parsing portion 104 is read out. Then, the process is advanced to a reading completion judgement step 202.

At the reading completion judgement step 202, check is performed whether the current recording unit read out at the reading process step 201 is the last recording of the intermediate code file, namely whether the end of the intermediate code file is reached. When the end of the intermediate code file is reached, the process is advanced to a data assignment processing step 210. On the other hand, if the end of the intermediate code file is not yet reached, the process is advanced to a data definition discriminating step 203.

In the data definition discriminating step 203, judgement is made whether the recording unit read out at the reading processing step 201 is a data definition (declaration of the external parameter) of the external parameter or not. If the recording unit in question is the data definition of the external parameter, the process is advanced to a data length analysis processing step 205. On the other hand, if the recording unit in question is not the data definition of the external parameter, the process is advanced to an object generating process 204 for generating an object of the read out recording unit.

In the data length analysis processing step 205, judgement is made whether the read out recording unit is the external parameter information having 4 bytes of data length. If the recording unit in question is the external parameter information having 4 byte data length, the process is advanced to a data assignment processing step 206, and otherwise, the process is advanced to a data length analysis processing step 207.

In the data assignment processing step 206, an object for assigning the read out external parameter information to the data region is generated. Then, the process is returned to the reading processing step 201.

In the data length analysis processing step, judgement is made whether the external parameter information has 2 bytes of data length or not. If the external parameter has 2 bytes of data length, the process is advanced to a parameter storage processing step 208, and otherwise, the process is advanced to a parameter storage processing step 209. At the parameter storage processing steps 208 and 209, the read out external parameter information is stored in a storage block for the corresponding data length in the parameter information storage portion 108. After thus storing the external parameter data, the process is returned to the reading processing step 201.

The following table 1 imaginally shows the parameter information storage portion 109, in which the external parameter information is stored at the parameter storage processing steps 208 and 209

TABLE 1

| 1 Byte Data | 2 Bytes Data |
| Parameter Name | Parameter Name |

At the data assignment processing step 210, an object for assigning the external parameter information having 2 bytes of data length stored in the parameter information storage portion 109 at the parameter storage processing step 208 is generated for assigning to the data region. Then, the process is advanced to a data assignment processing step 211. At the data assignment processing step 211, an object for assigning the external parameter information having 1 byte of data length stored in the parameter information storage portion 109 at the parameter storage processing step 208 is generated for assigning to the data region.

Here, it is assumed that the program illustrated in FIG. 20 is the source program read in the input portion 103 from the input file 101. In the case where the above-mentioned program is assumed as the source program supplied from the input file 101, the following process is performed in a manner set out below.

At first, at the parsing portion 104, judgement is made that ① to ④ of FIG. 20 are data definitions for the external parameters. Then, the external parameter information is output as the intermediate code file. At the reading processing step 201, the intermediate code file output from the parsing portion 104 is read out per one recording unit.

When the record information of the external parameter information "c1" is read out, the external parameter information "c1" as the parameter information having 1 byte data length, is stored in the parameter information storage portion 109 at the step 209. The following table 2 is an imaginary illustration of the content of the parameter information storage portion when the parameter information "c1" is stored. After storing "c1" at a portion shown by ① in the table 2, the process is returned to the reading processing step 201.

TABLE 2

| 1 Byte Data | 2 Bytes Data |
|---|---|
| ① c1<br>③ c2 | ② i |

Next, when the external parameter information "i" is read out, the record information of the parameter information "i" having 2 bytes of data length is stored in the portion ② of the table 2 at the parameter information storage processing step 208. Then, the process is returned to the reading processing step 201. Subsequently, when the record information of the external parameter information "c2" is read out, the parameter information "c2" having 1 byte of data length, is stored in the portion ③ in the table 2 at the parameter storage processing step 209. Thereafter, the process is returned to the reading processing step 201.

Next, when the record information the external parameter information "1" is read out, an object for assigning the external parameter information "1" having 4 bytes of data length to the data region is generated by the data assignment processing step 206. Thereafter, the process is returned to the reading processing step 201.

When reading of all intermediate code file output from the parsing portion 104 is completed, object is generated for assigning the parameter information having 2 bytes of data length stored in the parameter information storage portion 109 to the data region at the data assignment processing step 210. In the foregoing table 2, the external parameter information having 2 bytes of data length is "i". Therefore, at the data assignment processing step 210, the object for assigning the external parameter information "i" is generated.

Next, at the data assignment processing step 211, an object is generated for assigning the external parameter information having 1 byte of data length stored in the parameter information storage portion 109, to the data region. In the foregoing table 2, the external parameter information having 1 byte of data length are "c1" and "c2". Therefore, at the data assignment processing step 210, the objects for assigning the external parameter information "c1" and "c2" are generated. ① to ③ in FIG. 3 imaginary illustrate there external parameter information "i", "c1", "c2" assigned to the data region.

As set forth above, in the shown embodiment, the external parameter information in the program are assigned in the data region in descending order of the data length to assign the parameter information having greater data length at earlier. Therefore, it becomes unnecessary to calculate correction regions as those required in the prior art. This contributes reduction of the data region for assigning the external parameter information. Also, in case of the 2 bytes alignment or 4 bytes alignment, it becomes possible to assign the external parameter information to the data region in the similar process to that set forth above. Therefore, it becomes possible to unify the data assignment process irrespective of the difference of the architecture of the computer systems.

Next, discussion will be given for the second embodiment of the language processing system according to the present invention. It should be noted that the construction of the system in the shown embodiment is the same as the foregoing first embodiment and thus as illustrated in FIG. 1.

The shown embodiment is differentiated from the foregoing first embodiment in that instead classifying the external parameter information depending upon the data length by the data assignment analyzing portion 108 in FIG. 1 for storing in the parameter information storage portion 109, the parameter information storage portion 109 is provided with a function for storing the external parameter information name and the data length thereof with establishing association therebetween.

It should be noted that, in the following discussion for the shown embodiment, the external parameter information to be handled in the program is assumed to have data length of 1 byte, 2 bytes and 4 bytes, similarly to the foregoing first embodiment. Furthermore, the contents common to the first embodiment will be neglected from discussion and only contents different from the first embodiment will be discussion in detail.

Figure 4:
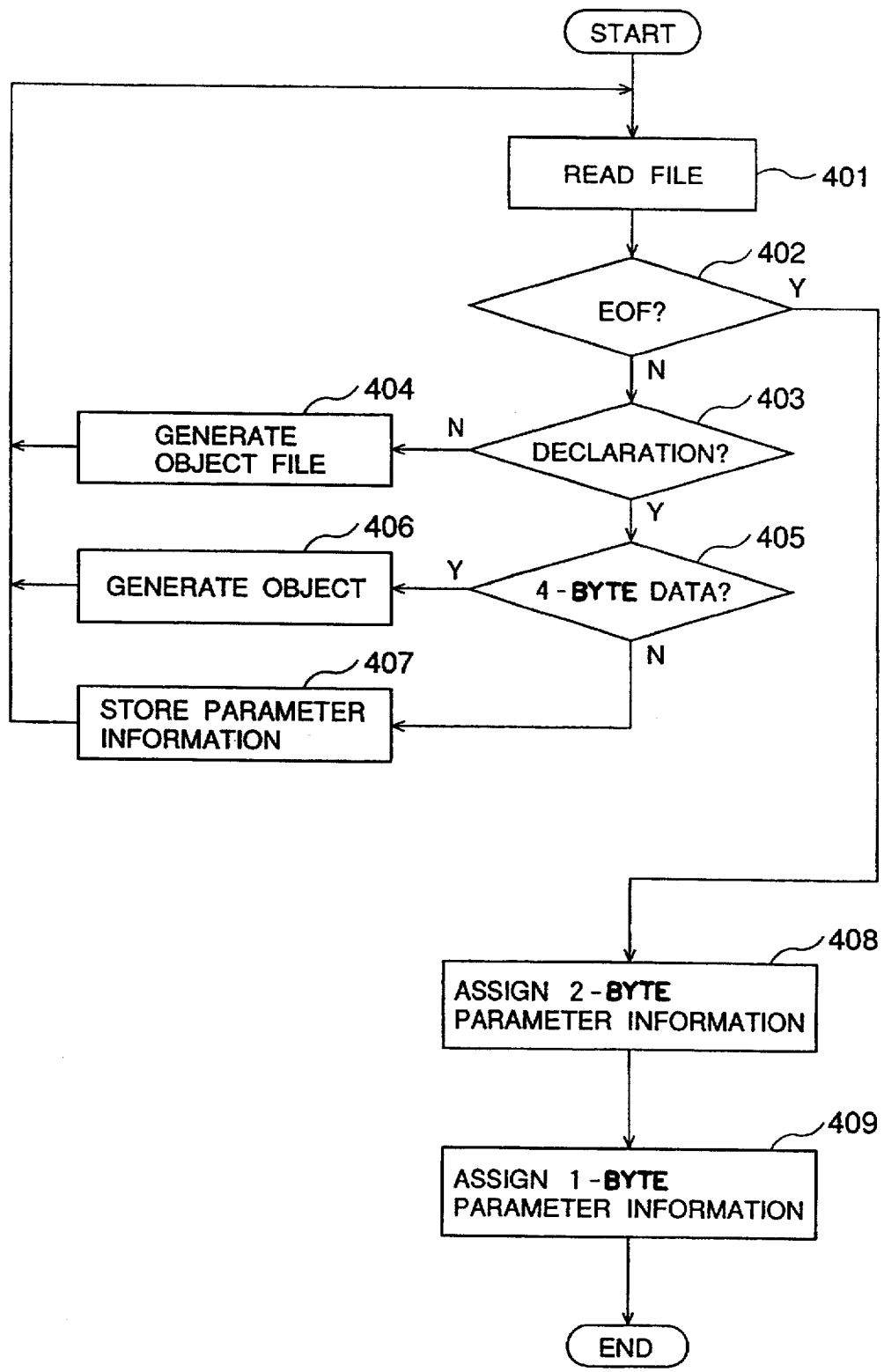
FIG. 4 is a flowchart showing a processing in the data assignment analyzing portion in the second embodiment of a language processing system according to the invention.

FIG. 4 is a flowchart showing a processing procedure in the data assignment analyzing portion 108 in the language processing program executing portion 102. The process steps 401 to 406 in the shown embodiment are similar to the process steps 201 to 206 in the foregoing first embodiment. At a parameter storage processing step 407, the read out external parameter information name and the data length of the external parameter information are stored in the parameter information storage portion 109. Then, the process is returned to the step 401.

The following table 3 imaginary illustrates the content of the parameter information storage portion 109 in the second embodiment. As can be seen, in the table 3, the parameter information name is stored in the left half and the data length of the parameter information is stored in the right half. In the parameter storage processing step 407, the external parameter information name and the data length thereof are stored in the parameter information storage portion in the order of reading out.

TABLE 3

| Parameter Name | Data Length |
|---|---|
| " | " |
| " | " |
| " | " |

In a data assignment processing step 408, the information stored in the parameter information storage portion 109 is read out, and the object for assigning the parameter information having 2 bytes of the data length to the data region is generated. This process is repeated until objects for all parameter information having 2 bytes data length are generated. When no parameter information having 2 bytes data length is remained, the process is advanced to a data assignment processing step 409.

Similarly to the data assignment processing step 408, in the data assignment processing step 409, the process for reading out the parameter information stored in the parameter information storage portion 109 is performed. In the data assignment processing step 409, an object is generated for assigning the external parameter data having 1 byte data length to the data region.

The following table 4 shows the content of the parameter information storage portion 198 storing parameter information written at the step parameter storage process step 407 in the case where the source program shown FIG. 20 is input from the input file 101 similarly to the foregoing first embodiment.

TABLE 4

| Parameter Name | Data Length (Byte) |
|---|---|
| c1 | 1 |
| i | 2 |
| c2 | 1 |

In this case, when the information in the parameter information at the data-assignment processing step 408, the following process is performed. At first, the external parameter information "c1" has the 1 byte data length, this parameter information is ignored. Next external parameter information "i" has the 2 bytes data length. Then, the object for assigning the parameter information "i" to the data region is generated. Next, the external parameter information "c2" has the 1 byte data length and thus is ignored.

Then, since no further external parameter information following to the parameter information "c2" is present, the process is advanced to the data assignment processing step 409. Similarly to the step 408, in the data assignment processing step 409, objects for assigning parameter information of 1 byte data length are generated for assignment to the data region.

Figure 3:
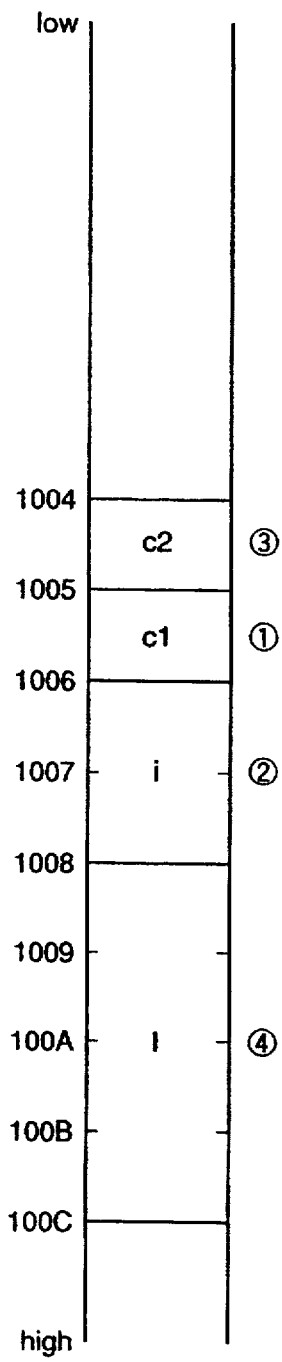
FIG. 3 is an illustration showing a condition of a data region, for which external parameter is assigned by the first embodiment of the language processing system.

When the case where data is assigned to the data region in consideration of alignment shown in FIGS. 11 and 12 is compared with the case where data is assigned to the data region in the foregoing first and second embodiment as illustrated in FIG. 3, it should be clear than the present invention permits reduction of the data region for 2 bytes in the 2 bytes alignment and for 4 bytes in the 4 bytes alignment. Also, as shown in FIG. 3, since the external parameter data can be assigned to the data region in the uniform manner irrespective of the alignment amount, data assignment process can be performed uniformly irrespective of the difference of architecture of the computer systems.

Next, the third embodiment of the language processing system according to the present invention will be discussed. The different point of the shown embodiment from the first and second embodiments set forth above is that while the first and second embodiments realizes the assignment process for assigning the external parameter data to the data region, the shown embodiment is characterized by assignment process of an argument of a function to a stack region. The source program to be handled in the shown embodiment is a program containing a declaration of prototype in the program or a program having definition of a function before calling of the function. Also, the arguments of the function to be handled in the program are assumed to be the three types, i.e. those having data lengths of 1 byte, 2 bytes and 4 bytes.

Figure 5:
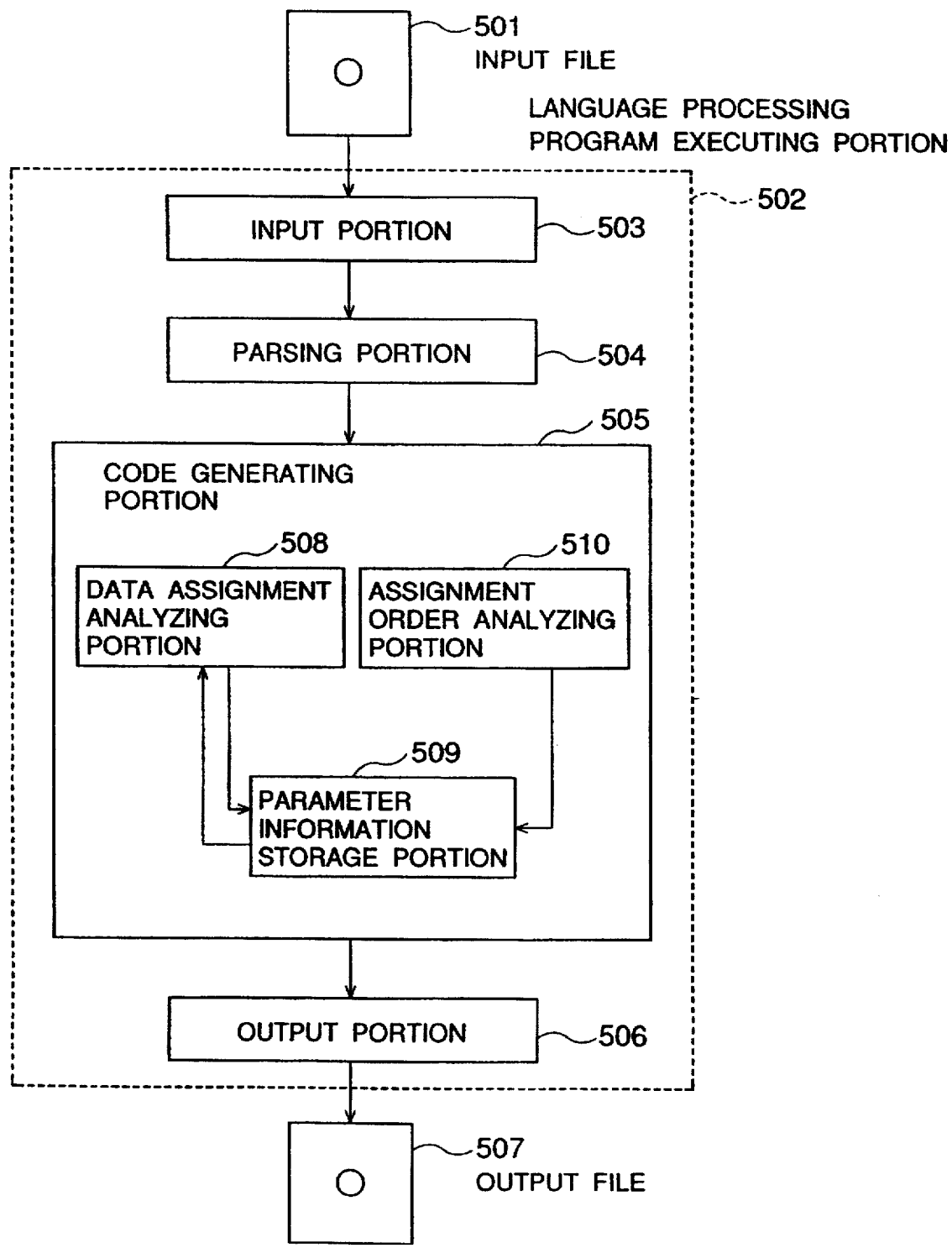
FIG. 5 is a block diagram showing a construction of the third embodiment of a language processing system according to the present invention.

FIG. 5 is a block diagram showing the third embodiment of the language processing system according to the present invention. As shown in FIG. 5, similarly to the construction of FIG. 1, the shown embodiment of the language processing system includes an input file 501 storing a source program, a language processing program executing portion 502 for generating an object program from the source program, and an output file 507 for storing the generated object program.

The language processing program executing portion 502 comprises an input portion 503 receiving the source program from the input filter 501, a parsing portion 504 for paring the input source program and generating an intermediate code file, a code generating portion 505 generating an object program from thus generated intermediate code file and an output portion 106 for outputting thus generated object file to the output file 507.

The code generating portion 505 includes a data assignment analyzing portion 508 for analyzing data length of argument of function contained in the input source program and assigning the argument of function to predetermined stack region and a parameter information storage portion 509 for storing the argument of function, analyzed data length information and assignment order information. As can be clear from comparison with FIG. 1, the difference of the shown embodiment from the first and second embodiment in the construction is that an assignment order analyzing portion 510 is added for the code generating portion 505. The input file 501, the input portion 508, the parsing portion 504, the data assignment analyzing portion 508, the parameter information storage portion 509, the output portion 506 and the output file 507 are respectively the same as respectively corresponding elements in FIG. 1.

Figure 6:
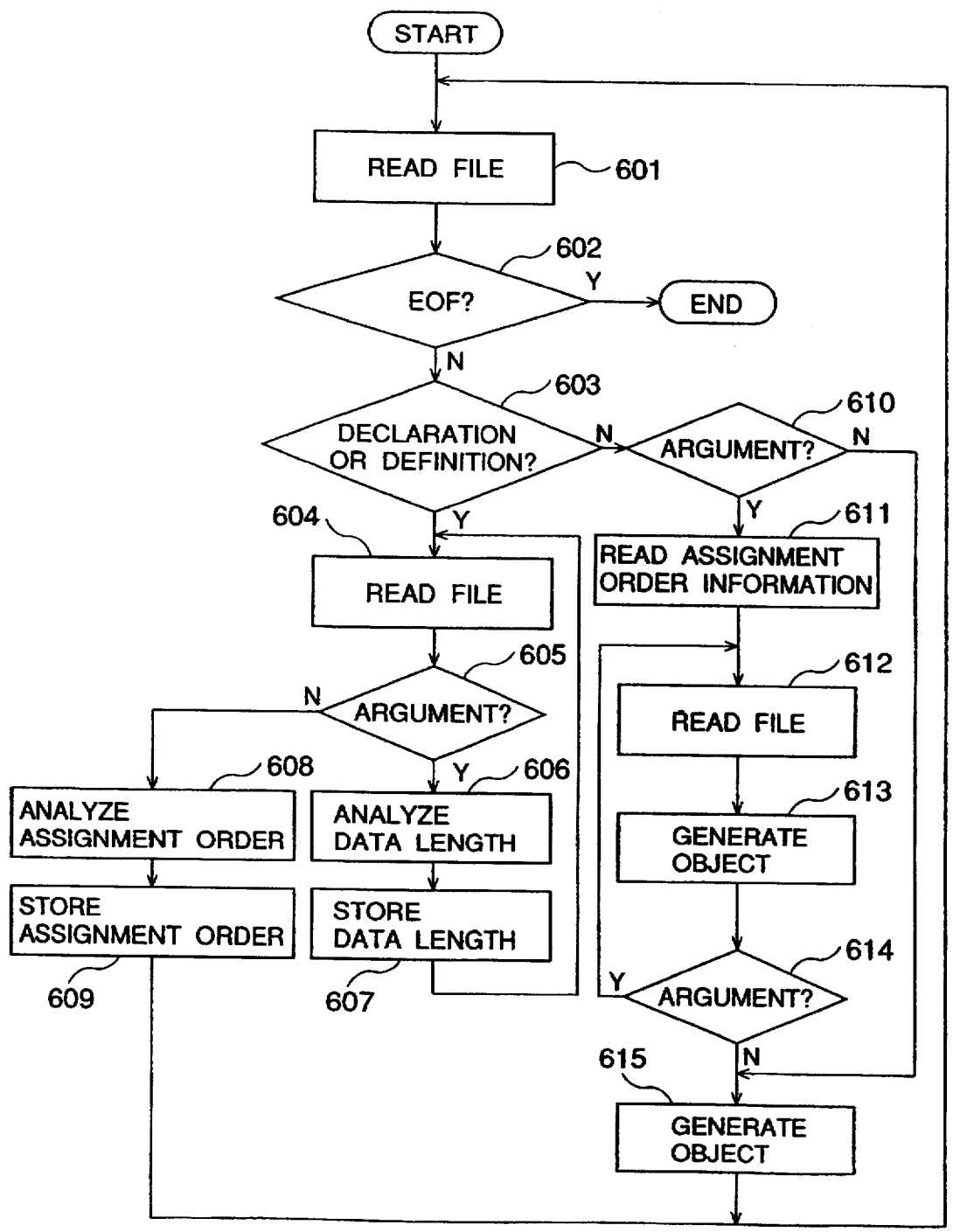
FIG. 6 is a flowchart showing a process in a data assignment analyzing portion and an assignment order analyzing portion in the third embodiment of the language processing system.
Figure 10:
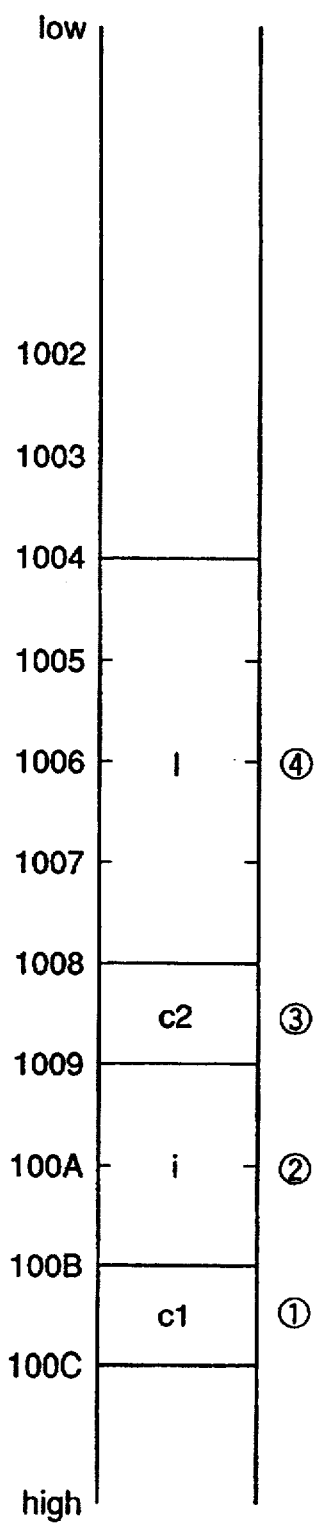
FIG. 10 is an illustration showing a condition of the data region, for which external parameter is assigned in the order of appearance in the conventional manner.
Figure 13:
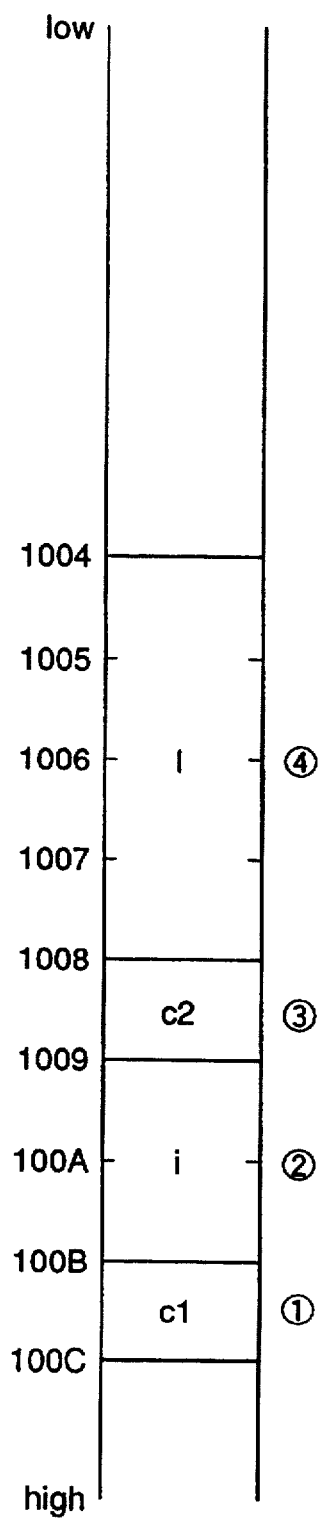
FIG. 13 is an illustration showing the condition of assignment, in which the arguments of function are assigned in the order of appearance.
Figure 14:
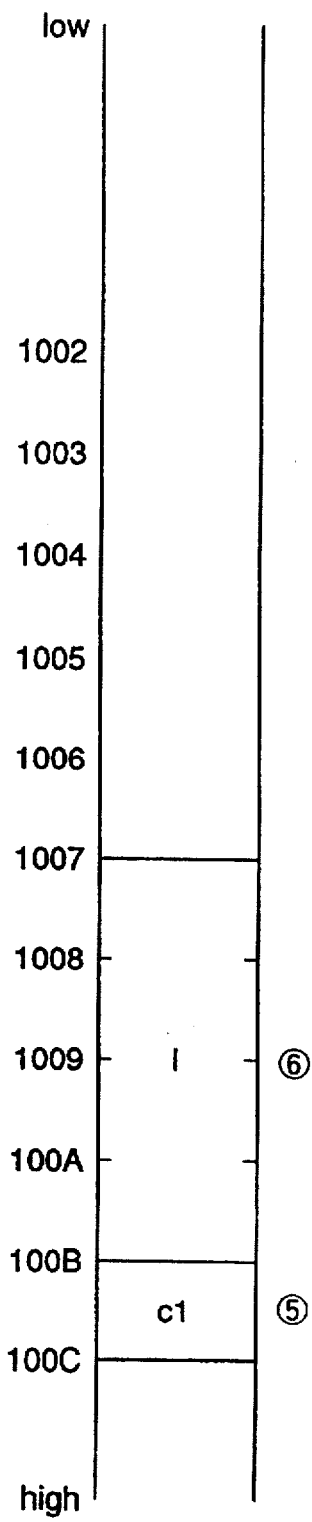
FIG. 14 is an illustration showing the condition of assignment, in which the arguments of function are assigned in the order of appearance.

FIG. 6 is a flowchart showing the processing procedure in the data assignment analyzing portion 508 and the assignment order analyzing portion 510 included in the language processing program executing portion in the third embodiment of the language processing system.

Similarly to the foregoing first and second embodiments, at a reading processing step 601, the intermediate code file output from the parsing portion 504 is read out per one recording unit. Then, the process is advanced to a reading completion judgement step 602. At the reading completion judgement step 602, check is performed whether the current recording unit read out at the reading process step 601 is the last recording of the intermediate code file, namely whether the end of the intermediate code file is reached. When the end of the intermediate code file is reached, the process ends.

On the other hand, if the end of the intermediate code file is not yet reached, the process is advanced to a function declaration discriminating step 603. At the function declaration discriminating step 603, judgement is made whether the recording unit read out at the reading processing step 601 is a function declaration or a function definition. If the recording unit in question is the function declaration or the function definition, the process is advanced to a reading processing step 604. On the other hand, if the recording unit in question is not the function declaration or the function definition, the process is advanced to a function argument discrimination process step 610.

At the reading processing step, the intermediate code file is read out per one recording unit similarly to the reading processing step 601. Thereafter, the process is advanced to a argument discrimination processing step 605. At the argument discrimination processing step 605, judgement is made whether the record information read at the reading processing step 604 is the argument or not. If the record information is the argument, the process is advanced to a data length analysis processing step 606. On the other hand, if the record information is not the argument, the process is advanced to the assignment order analysis processing portion 608.

At the data length analysis processing step 605, the data length of the argument is analyzed from the read out record information. Then, the process is advanced to the storage processing step 607. At the storage processing step 607, the data length of the read out argument is stored in the parameter information storage portion 509. Then, the process is advanced to the reading processing step 604. The processes from the reading processing step 604 to the storage processing step 607 are repeated until all arguments are processed.

At the assignment order analysis processing step 608, from the data length information of the argument stored in the parameter information storage portion 509, the order for assigning in the stack region is determined. Then, the process is advanced to a storage processing step 609. The order for assigning in the stack region is the order to 4 bytes, 2 bytes and ten 1 byte depending on the data length. In case of the arguments having the same data length, the order of assignment is determined depending upon the order of reading out. At the storage processing step 609, the assignment order information analyzed at the assignment order analysis processing step 608 is stored in the parameter information storage portion 509. Then, the process is returned to a reading processing step 601.

At the function argument discrimination processing step 610, judgement is made whether the read out record information is the argument of the function or not. When the record information is the argument of the function, the process is advanced to a assignment information reading processing step 611. On the other hand, when the record information is not the argument, the process is advanced to an object generating step 615.

At the assignment information processing step 611, the assignment order information stored in the parameter information storage portion 509 is read out. Then, the process is advanced to a reading processing step 612. At the reading processing step 612, the intermediate code file is read out with reference to the read out assignment order information. Then, the process is advanced to a step stack assignment processing step 613. At the stack assignment processing step 613, object for assigning and stacking the read out argument to the stack region is generated. Thereafter, the process is advanced to the function argument discrimination processing step 614.

At the function argument discrimination processing step 614, reference is made to the arguments stored in the parameter information storage portion 509 so that the processes is repeated by returning to the reading processing step 612 as long as the argument not yet stacked in the stack region is remained. When process for all arguments is completed, the process is advanced to an object generation processing step 615.

Here, it is assumed that the program shown in FIG. 21 is a source program to be supplied to the input portion 503 from the input file 501. Then, at first, the intermediate code file corresponding to the source file of FIG. 21 is output from the parsing portion 504.

The following table 5 show record information with respect to F1 and F3 in the program of FIG. 21. For the record information shown in the table 5, the process is performed through the following order.

TABLE 5

| (Record Information Corresponding F1) | |
|---|---|
| Beginning of Prototype Declaration of Function fuc | F5 |
| 1 Byte Argument | ① |
| 2 Bytes Argument | ② |
| 1 Byte Argument | ③ |
| 4 Bytes Argument | ④ |
| End of Prototype Declaration of Function fuc | F6 |
| (Record Information Corresponding F3) | |
| 1 Byte Argument c1 | ⑤ |
| 2 Bytes Argument i | ⑥ |
| 1 Byte Argument c2 | ⑦ |
| 4 Bytes Argument l | ⑧ |
| Call Function fun | ⑨ |

When the record information shown as F5 in the foregoing table 5 at the reading processing step 601, judgement is made that the record information is the function deceleration at the step function declaration discrimination processing step 603. Then, the process is advanced to the reading processing step 604. At the step reading processing step 604, ① of the table 5 as the next record information is read out. Subsequently, at the argument discrimination processing step 605, the positive judgement is made since the record information of ① of the table 5 is argument. Then, the process is advanced to the data length analysis processing step 606. Judgement is then made that the ① of the table 5 is 1 byte argument. Then, at the storage processing step 607, the data length information is stored in the parameter information storage portion 509. Thereafter, the process is returned to the reading processing step 604.

The following table 6 shows the content of the parameter information storage portion at this time. At the data length analysis processing step 606, the data length "1" is stored at ① of the table 6.

TABLE 6

| Argument Name | Data Length | Assignment Order |
|---|---|---|
| ① | 1 | |
| ② | 2 | |
| ③ | 1 | |
| ④ | 4 | |

Similarly, the ② to ④ in the table 5 are processed and the data lengths thereof are stored in ② to ④ of the table 6.

Next, when the record information shown by F6 in the table 5 is read out, judgement is made that the record information in question is not the argument at the argument discrimination processing step 605. Then, the process is advanced to the assignment order analysis processing step 608. When the information of the parameter information storage portion 509 shown in the table 6 is read out at the assignment order analysis processing step 608, the following process is performed.

At first, since the argument having the 4 bytes data length is only ④ in the table 6, assignment order "1" is given for this argument. Next, since the argument having the 2 bytes data length is only ② in the table 6, the assignment order "2" is given for this argument. Subsequently, since the argument having the 1 byte data length are ① and ③ of the table 6. As set forth, since the earlier assignment order is given for the argument read out earlier when the data lengths are the same to each other, the assignment order "3" is given for the argument of ① in the table 6 and assignment order "4" is given for the argument ③ of the table 6.

Next, at the storage processing step 609, the assignment order information analyzed at the assignment order analysis processing step 608 is stored in the parameter information storage portion 509. Then, the process is returned to the reading processing step 601.

The following table 7 shows the condition where the assignment order information derived from the content of the table 6 is stored in the parameter information storage portion 509.

TABLE 7

| Parameter Name | Data Length | Assignment Order |
|---|---|---|
| ① | 1 | 3 |
| ② | 2 | 2 |
| ③ | 1 | 4 |
| ④ | 4 | 1 |

Next, when the ⑤ of the table 5 is read out at the reading processing step 601, then judgement is made that the record information is the argument of the function at the function argument discrimination processing step 610 to advance the process to the assignment information reading processing step 611. At the assignment information reading processing step 611, the assignment order information containing the content of the table 7 stored in the parameter information storage portion 509 is read out. After reading the assignment order information, the process is advanced to the reading processing step 612. At the reading processing step 612, the record information of the argument corresponding to the assignment order "1" in the read out assignment order information is read out. In the case of the example in the table 7, the assignment order "1" is given for ④. ④ is the argument in the fourth order in function declaration, ⑧ of the table 5 is read out. Then, at the stack assignment processing step 613, the object for assigning and stacking the argument "1" in the stack region.

Similarly, the record information of the arguments corresponding to ⑥, ⑤, ⑦ of the table 5 are read out and the objects for assigning and stacking them to the stack region are generated.

Figure 7:
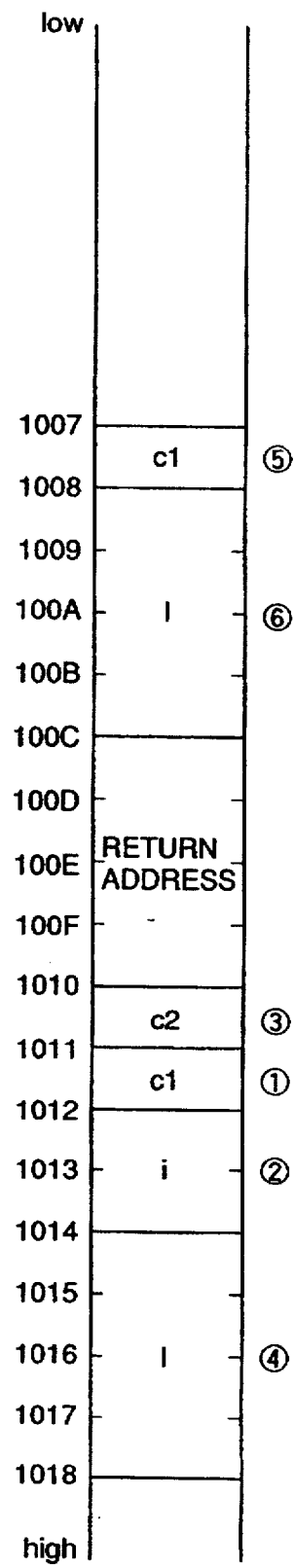
FIG. 7 is an illustration of the condition of a stack region, for which assignment of arguments of a function by the third embodiment of the language processing system.

FIG. 7 is an imaginary illustration showing the content of the stack region when the assignment of the arguments is performed through the foregoing process. Also, ⑤ and ⑥ in FIG. 7 show the assignment condition in the case where assignment process for the argument is performed with respect to F4 (call of function sub) shown in FIG. 21. Comparing the case where the arguments are assigned in consideration of alignment and the case where the arguments are stacked by the process of the present invention with reference to FIGS. 7, 17 and 18, it will become clear that when the arguments are stacked through the process, to which the present invention is applied, 3 bytes of stack region can be reduced in comparison with the 2 bytes alignment process and 7 bytes of stack region can be reduced in comparison with the 4 bytes alignment.

As set forth above, by stacking the arguments of the function in the source program in the descending order (greater data length is given higher priority in assignment) depending upon the data length, the correction region which was required in the conventional alignment process becomes unnecessary to successfully save the stack region. Also, even in the case of 2 bytes alignment and 4 bytes alignment, it becomes possibly to assign the arguments of the function to the stack regions in the processes similar to those set forth above. Therefore, data assignment process can be performed in uniform manner without depending upon the difference of the architecture of the computer systems.

As set forth above, by classifying the external parameter or arguments of the function in the program depending upon the data length and assign then to the data region or stack region in the descending order depending upon the data length, the correction region which is otherwise required, becomes unnecessary to reduce the required capacity of the data region and/or the stack region.

Also, since it becomes possible to assign the parameters in the data region and/or stack region in the uniform manner irrespective of the alignment amount, assignment process for the parameter and argument can be unitarily performed without depending upon the architecture of the computer system.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A language processing system comprising:
   parsing means for inputting a source program described by a high-level language, analyzing, and generating an intermediate code file on the basis of the analysis;
   code generating means for generating an object program corresponding to said source program analyzed by said parsing means, said code generating means including:
   parameter analyzing means for analyzing data length of external parameter information contained in said source program; and
   parameter assigning means for assigning the external parameter information to a predetermined data region in descending order of the data length analyzed and in the order of appearance of the external parameter information.

2. A language processing system as set forth in claim 1, further comprising parameter information storage means for storing said external parameter information and the data length analyzed by said parameter analyzing means.

3. A language processing system as set forth in claim 1, further comprising parameter information storage means for storing said external parameter information and the data length analyzed by said parameter analyzing means in mutually associated position, wherein the data length of said external parameter information analyzed by said parameter analyzing means has a predetermined maximum data length,
   wherein when the external parameter information has the maximum data length, said external parameter information is assigned to said data region by said parameter assigning means in the order of appearance thereof, and when the external parameter information analyzed by said parameter analyzing means has other than the maximum data length, said parameter information storage means stores said external parameter information and said data length in the order of appearance thereof.

4. A language processing system as set forth in claim 3, wherein said parameter information storage means classifies and stores said external parameter information having other than the maximum data length depending upon the data length and in the order of appearance thereof.

5. A language processing system as set forth in claim 3, wherein said external parameter information storage means stores sets of parameter names of said external parameter information having other than the maximum data length and the data lengths in the order of appearance thereof.

6. A language processing system as set forth in claim 1, wherein when the data length of said external parameter information is powers of 2, said parameter assigning means assigns said external parameter information in said data region in the descending order depending upon the data length.

7. A language processing system comprising:
   parsing means for inputting a source program described by a high-level language, analyzing, and generating an intermediate code file on the basis of the analysis;
   code generating means for generating an object program corresponding to said source program analyzed by said parsing means, said code generating means including:
   parameter analyzing means for analyzing data length of external parameter information contained in said source program;
   assigning order analyzing means for analyzing the order for assigning the external parameter information in a predetermined data region with reference to the data length of the external parameter information analyzed by said parameter analyzing means and outputting an assignment order information; and
   parameter assigning means for assigning the external parameter information to said predetermined data region according to said assignment order information.

8. A language processing system as set forth in claim 7, wherein said external parameter information is an argument of a function described in said source program.

9. A language processing system as set forth in claim 7, further comprising parameter information storage means for storing said external parameter information and the data length and said assignment order information.

10. A language processing system as set forth in claim 7, wherein said assignment order analyzing means analyzes the assignment order of said external parameter information and assigns the external parameter information to said data region in descending order of the data length analyzed and in the order of appearance thereof.

11. A language processing system as set forth in claim 7, further comprising parameter information storage means for storing said external parameter information, the data length, and said assignment order information,
   wherein said assignment order analyzing means analyzes the assignment order of said external parameter information and assigns the external parameter information to said data region in descending order depending upon said data length and in the order of appearance thereof, and stores the data length and the assignment order information in said parameter information storage means in the order of appearance thereof.

12. A language processing system as set forth in claim 7, further comprising parameter information storage means for storing said external parameter information, the data length, and said assignment order information, wherein said assignment order analyzing means analyzes the assignment order of said external parameter information and assigns the external parameter information to said data region in descending order depending upon said data length and in the order of appearance thereof, and stores the data length and the assignment order information in said parameter information storage means in the order of appearance thereof, and wherein said parameter assigning means assigns said external parameter information to said data region according to said assignment order information with reference to said assignment order information of said external parameter information stored in said parameter information storage means in the order of appearance thereof.

\* \* \* \* \*